June 29, 1937.　　R. T. STEINDORF　　2,085,514
SEDIMENTATION APPARATUS
Filed Aug. 19, 1935　　3 Sheets-Sheet 1
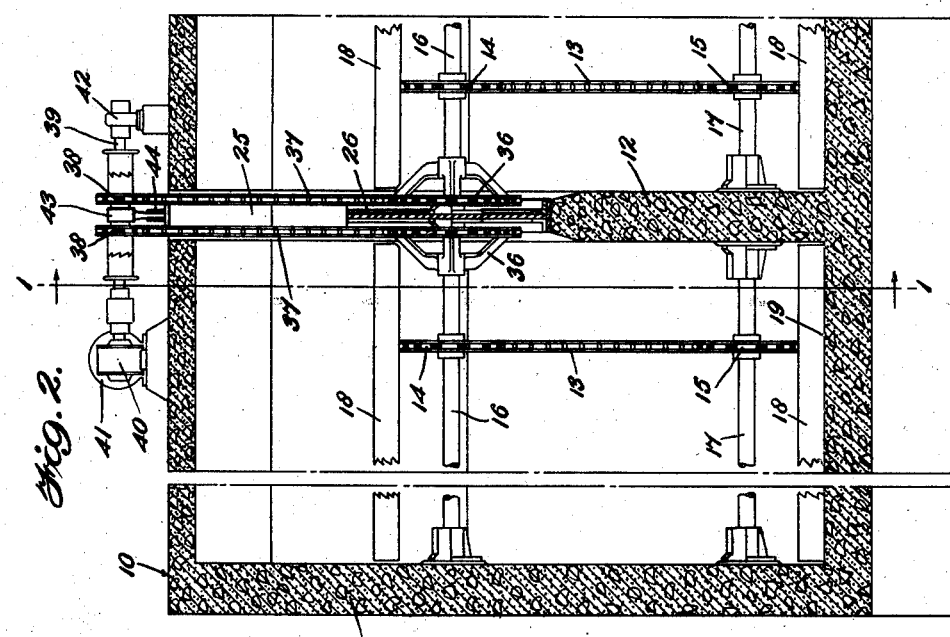
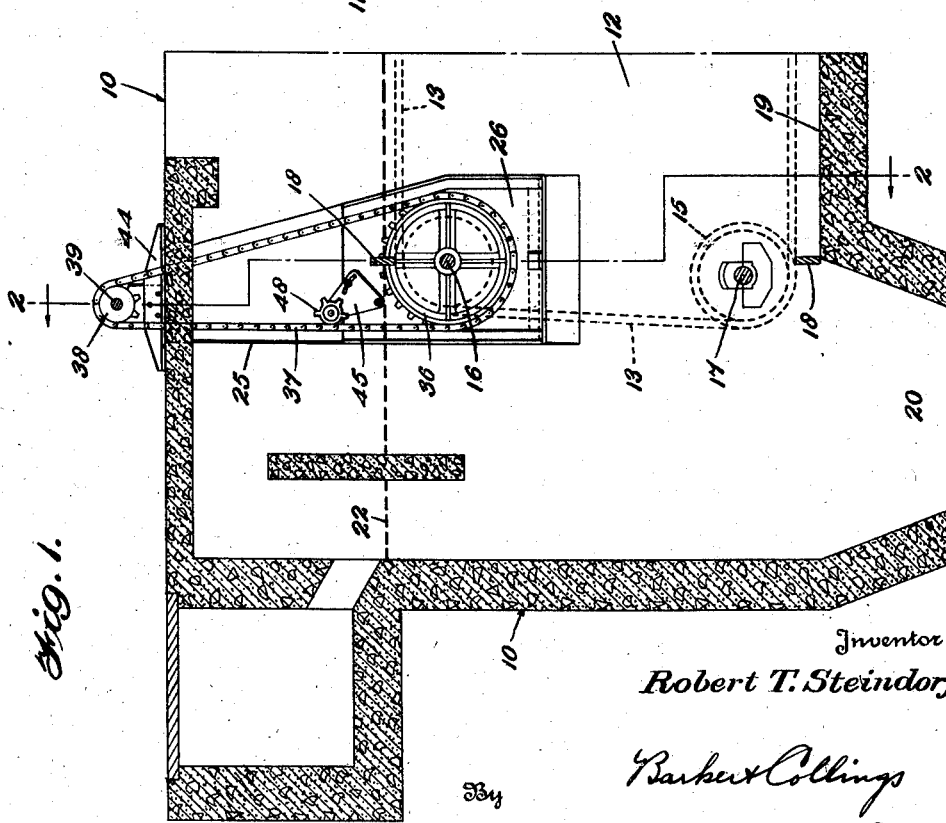
Inventor
Robert T. Steindorf,
By Barker & Collings
Attorneys June 29, 1937.   R. T. STEINDORF   2,085,514
SEDIMENTATION APPARATUS
Filed Aug. 19, 1935   3 Sheets-Sheet 2
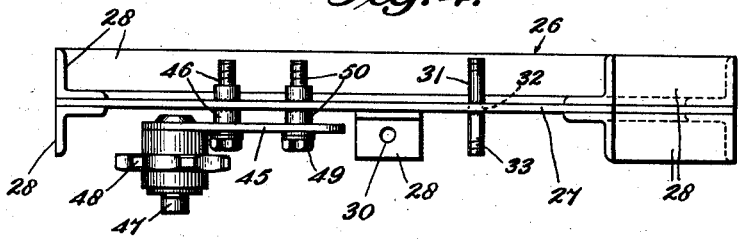
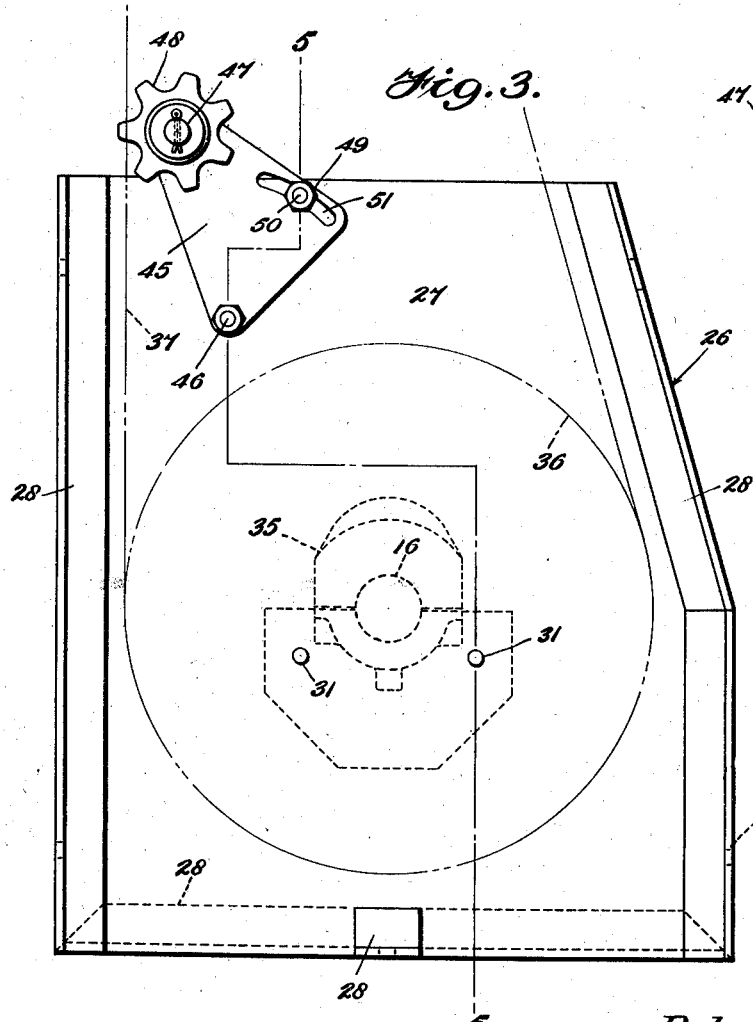
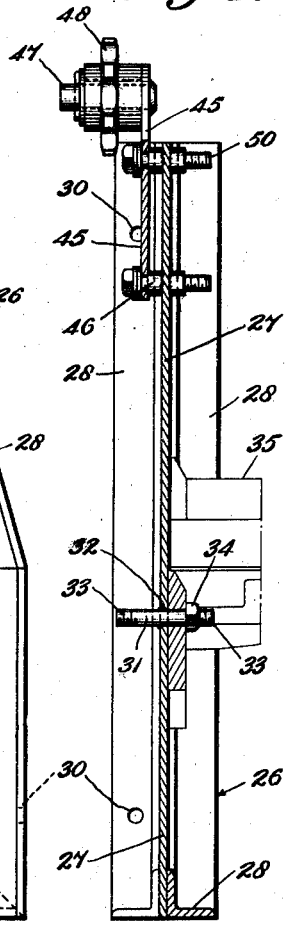
Inventor
Robert T. Steindorf,
By Barker & Collings
Attorneys

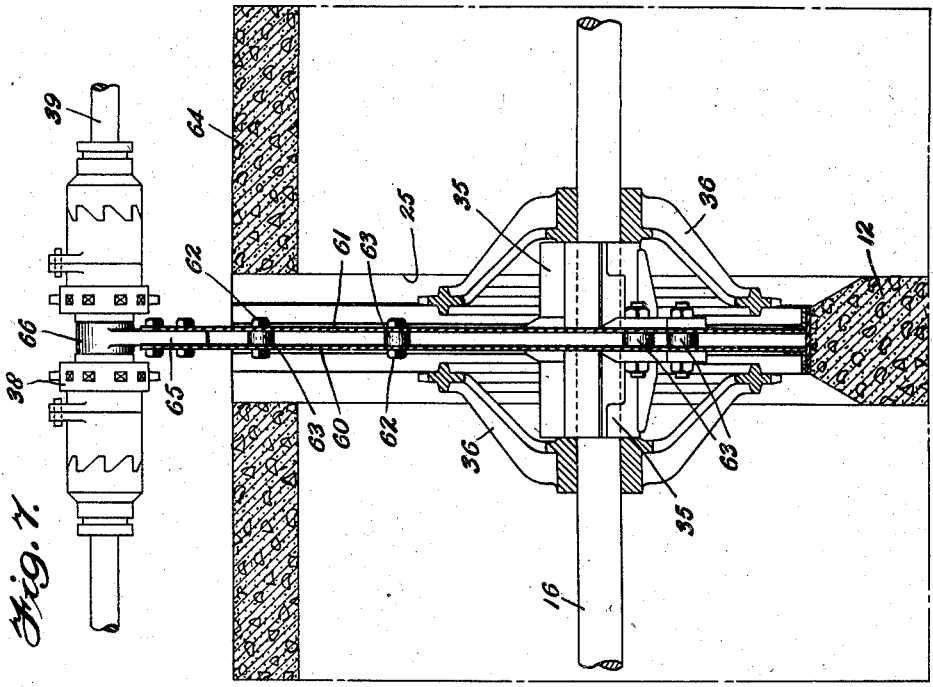
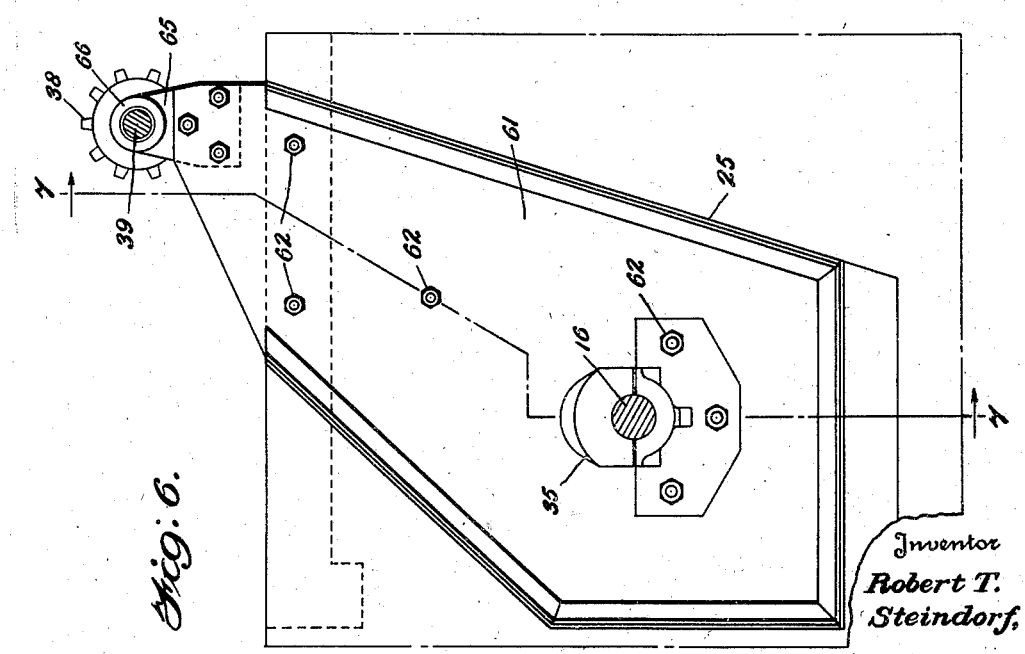

Patented June 29, 1937

2,085,514

UNITED STATES PATENT OFFICE 2,085,514

SEDIMENTATION APPARATUS

Robert T. Steindorf, Milwaukee, Wis., assignor to Chain Belt Company, Milwaukee, Wis., a corporation of Wisconsin Application August 19, 1935, Serial No. 36,929

9 Claims. (Cl. 210—55)

This invention relates to sedimentation apparatus and the like, and more particularly to bearing mountings for sedimentation tanks, and has for one of its objects to improve over the structures which have been heretofore proposed and used for this purpose.

In a well known and widely used form of sedimentation apparatus, settling tanks are provided having intermediate walls which divide them into adjacent compartments. Each compartment is provided with mechanism for removing the settled sludge therefrom, comprising endless flight conveyors which travel around sprockets carried by shafts which extend transversely of the compartments, and are so disposed as to cause the flights upon one run to travel over the floor of the tank and scrape the sludge to a sump at one end. The return run of the conveyor may be so arranged that the flights just break the surface of the liquid in the tank, and thereby sweep any scum and/or floating debris to a scum receptacle at the other end of the tank.

All of the said conveyor shafts are below the normal level of the liquid in the tank, and their bearings are ordinarily mounted upon the side walls of the compartments. One of the shafts, usually an upper one, is provided with a driving means in the form of a gear or sprocket, which is driven from a drive shaft and source of power located outside the tank, on the top thereof. Although the sprocket is mounted on the head shaft as close to the bearing as is practical, yet in the prior constructions it has of necessity extended several inches, and perhaps a foot, away from the wall of the tank, and, being in the path of travel of the conveyor flights, has required that the latter do not extend to the tank wall. As a result, the flights could not sweep the scum and debris from the entire surface of the liquid; and in order to secure full width scumming, it has been the practice to provide a ledge along the wall at the liquid level, extending inwardly to the flight ends, thus in effect reducing the width of the tank at the liquid level to a distance equal to the actual length of the flights. A similar ledge or offset was also required where the wall joined the tank floor, so that the flights might sweep sludge from the entire floor area.

The tanks are usually constructed of concrete, with the division walls averaging some 12 inches in thickness, and the necessity of providing the ledges above mentioned throughout the length of the walls, which may run up to 100 feet or even more, has added materially to the construction costs, not only because of the aditional concrete, but also because of odd-shaped forms required. Some attempts have been made to meet this difficulty by reducing the thickness of the walls to provide comparatively a shallow recess into which the head shaft bearing which is adjacent the driving sprocket is set, but because the conveyor machinery is quite heavy, not a great deal of reduction in thickness of the wall can be made and still have it adequate to support the conveyor.

The present invention has for its principal object to solve this problem in a more efficient manner, and to wholly eliminate the necessity for the ledges above referred to with their additional expense; and to this end, the division walls are provided with openings extending completely through them at the points where the head shaft bearings are to be mounted, in which openings are secured liquid-tight metallic plate diaphragm structures to which the bearings are fastened. The said plate structures are only a small fraction of the thickness of the walls, affording deep recesses for the bearings, so that the major portions thereof lie within the planes of the side faces of the wall; and by employing sprockets with off-set rims, as shown and described in the prior U. S. patent to Samuel Shafer, Jr., No. 1,956,206 granted April 24, 1934, the conveyor flights may be extended to the normal plane of the wall face, eliminating the ledges completely, while permitting the flights to sweep scum from the surface and sludge from the bottom throughout the full width of the tank.

With the above and other objects in view, which will appear as the description proceeds, the invention consists in the novel details of construction and combinations of parts more fully hereinafter described, and particularly pointed out in the appended claims.

Referring to the accompanying drawings forming a part of this specification, in which like reference characters designate like parts in all the views:—

Figure 1 is a longitudinal vertical sectional view through the influent end of a well known type of sedimentation tank, with one form of the present invention shown therein;

Figure 2 is a fragmentary transverse sectional view, taken approximately on the plane indicated by the line 2—2 of Figure 1, looking in the direction of the arrows;

Figure 3 is an enlarged side elevational view of the diaphragm structure shown in Figures 1 and 2;

Figure 4 is a top plan view of the parts shown in Figure 3;

Figure 5 is a vertical sectional view, taken approximately on the plane indicated by the line 5—5 of Figure 3;

Figure 6 is an elevational view of a somewhat modified form of diaphragm structure; and Figure 7 is a transverse sectional view of this form, taken approximately on the plane indicated by the line 7—7 of Figure 6, looking in the direction of the arrows.

Referring more particularly to Figures 1 to 5 inclusive, 10 indicates the sedimentation tank having side walls 11 and one or more intermediate walls 12 dividing it into a plurality of compartments. Each compartment is provided with a sludge removing conveyor comprising sprocket chains 13 which pass around sprockets 14 and 15 mounted respectively upon the head shaft 16 and foot shaft 17. The chains 13 have secured to them scraper flights 18 which on the bottom run move along the floor 19 of the tank and scrape the settled sludge therefrom into a sump 20. The flights during their upper run break the surface of the liquid as indicated by the line 22 and thereby move any scum or debris floating upon the said liquid to a scum trough located at the opposite end of the tank.

The intermediate wall 12 is provided with an opening 25 extending completely through it from the top of the tank to a considerable distance below the liquid level 22. The diaphragm structure 26 constituting the gist of the present invention is mounted within this opening and rigidly secured therein in a liquid tight manner and as will be clear from Figure 1 extends from below to above the normal liquid level whereby it prevents liquid in one compartment from transferring to an adjacent compartment through the opening 25.

As best shown in Figures 3, 4, and 5, the said diaphragm structure comprises a metallic plate 27 which may be stiffened and reinforced by the angle members 28 disposed around its edges and welded or otherwise secured thereto in a watertight manner. These said members also serve as a means of securing the structure in place in the opening 25, bolts being passed through holes 30 formed in the flanges of the members 28 as will be readily understood.

The lower portion of the plate 27 is provided with a plurality of pins or studs 31 passing through apertures 32 formed in the plate and welded or otherwise rigidly secured therein. Said studs are threaded as indicated at 33 for the reception of nuts 34 whereby the bearing 35 for the head shaft 16 may be rigidly but detachably secured to the said plate. It will be understood that in the form illustrated, one such bearing is attached to either side of the plate so that the plate structure may serve as a support for the conveyor apparatus in the compartments on either side of wall 12.

The head shafts 16 have rigidly secured to them the sprockets 36 which as above stated, are preferably of a type having an offset rim as disclosed in said Shafer Patent No. 1,956,206, which rim is provided with sprocket teeth engaging the sprocket chain 37 which passes upwardly to sprocket 38 mounted upon the drive shaft 39 which is connected through a suitable reduction gear 40 with a motor or other source of power 41. The elements 38, 39, 40, and 41 as shown in Figures 1 and 2 are mounted upon the tank cover and outside of the compartments formed by the wall 12. The drive shaft 39 is journalled in suitable bearings 42 and 43, the latter of which is supported by angle members 44 spanning the orifice of the opening 25 where it passes through the tank cover.

The plate 27 may carry a chain tightener for the driving chain 37, here shown as comprising a substantially triangular plate 45 pivoted upon a stud 46 which is welded or otherwise secured to the plate 27 and carrying at its apex a stud or pin 47 upon which is journalled a sprocket wheel 48. The said chain tightener is adapted to be swung about the pivot 46 and maintained in any adjusted position by means of a nut 49 threaded upon a stud 50 rigid with the plate 27 and working in an arcuate slot 51 provided in the plate 45.

In the form of the invention shown in Figures 6 and 7 the diaphragm structure is composed of two spaced parallel plates 60 and 61 which may be secured together by suitable bolts or rivets 62 passing through sleeves or thimbles 63 which serve to maintain the spacing of the said plates. In this case the plates are extended upwardly to project above the cover 64 of the tank and at their upper extremities have secured between them the standard 65 of the drive shaft bearing 66. This form therefore provides a unitary mounting for both the bearings 35 of the head shaft 16 and the bearing 66 of the drive shaft 39.

As will be readily understood from Figures 2 and 7 the diaphragm structure in either of its forms is of materially less thickness than the wall 12 so that the major portion of the bearings 35 will lie between the vertical planes of the outer faces of the said wall as will also the rim portions of the drive sprockets 36. It therefore results that the conveyor flights 18 may be extended to the faces of the wall 12 and sweep the sludge from the entire area of the tank floor in each compartment as well as sweep the scum from the liquid surface throughout the entire width of the compartment, accomplishing these desirable results without the necessity of any inwardly projecting ledges as has heretofore been necessary.

It is obvious that those skilled in the art may vary the details of construction as well as the precise arrangement of parts without departing from the spirit of the invention and therefore, it is not wished to be limited to the above disclosure except as may be required by the claims.

What is claimed is:

1. In sedimentation apparatus and the like, a tank having a wall provided with an aperture therethrough extending below the normal liquid level; a metallic plate structure of materially less thickness than said wall, secured in said aperture and constituting a support for certain of the bearings of sedimentation apparatus contained in said tank; and a wheel mounted adjacent said plate with its rim portion lying wholly within the recess constituted by the plate, the aperture walls, and face of the tank wall.

2. In sedimentation apparatus and the like of the type having sludge-removing conveyors, a tank having a wall provided with an aperture extending below the normal liquid level; a liquid-tight metallic plate structure of materially less thickness than said wall, secured in said aperture; bearings for said conveyors mounted on said plate structure; and conveyor supporting wheels journalled by said bearings, at least the rim portions of said wheels and the major portions of said bearings lying within the planes of the outer faces of said wall.

3. In sedimentation apparatus and the like of the type having scum and sludge-removing conveyors, a tank having a wall provided with an aperture extending below the normal liquid level; a liquid-tight metallic plate structure of materially less thickness than said wall, secured in said aperture; a bearing secured to said structure; a conveyor shaft journalled in said bearing; and a driving wheel secured to said shaft, the rim portion of said wheel being located within the planes of the outer faces of said wall.

4. In sedimentation apparatus and the like, a tank having a relatively thick intermediate wall dividing it into adjacent compartments, said wall having an opening therethrough at the normal liquid level; a relatively thin bearing-supporting liquid-tight diaphragm secured in said opening substantially midway between the planes of the outer faces of said wall; and wheels mounted to either side of said diaphragm with their rim portions disposed within said wall face planes.

5. In sedimentation apparatus and the like of the type having scum and sludge-removing mechanism, a tank having a wall provided with an opening therethrough at approximately the normal liquid level; a plate structure of materially less thickness than said wall, closing said opening and providing a recess between it and the plane of the wall face; a bearing for the head shaft of said scum and sludge-removing mechanism secured to said structure; a drive shaft bearing carried by said structure; shafts journalled in the respective bearings; and driving connections between said shafts, the major portion of said connections being disposed in said recess and lying within the planes of the outer faces of said wall.

6. In sedimentation apparatus and the like of the type having scum and sludge-removing conveyors, a tank having an intermediate wall dividing it into adjacent compartments, said wall being provided with an opening therethrough extending below the normal liquid level; a liquid-tight diaphragm structure of materially less thickness than said wall, secured in said opening, said structure including a plurality of spaced parallel metallic plates which completely close off communication between said compartments through said opening; a bearing for the head shaft of the conveyor in each compartment, secured to each outer face of the lower portion of said diaphragm structure; and a drive shaft bearing secured to the upper portion of said structure.

7. In sedimentation apparatus and the like of the type having scum and sludge-removing conveyors, a tank having an intermediate wall dividing it into adjacent compartments, said wall being provided with an opening therethrough extending below the normal liquid level; a liquid-tight diaphragm structure of materially less thickness than said wall, secured in said opening, said structure comprising a metallic plate which completely closes off communication between said compartments through said opening; bearings for the head shafts of said conveyors secured to each face of said plate; and belt tighteners for the head shaft driving belts mounted on said plate.

8. A bearing mounting for sedimentation apparatus and the like, comprising a liquid-tight plate structure, adapted to be mounted in an opening in a wall of a sedimentation tank, said structure being of materially less thickness than said wall to provide a recess for the reception of at least the rim portion of a wheel mounted adjacent thereto, and having rigid studs projecting therefrom for mounting the head shaft bearings of the scum and sludge-removing conveyors.

9. A bearing mounting for sedimentation apparatus and the like, comprising a liquid-tight diaphragm structure adapted to be mounted in an opening in a wall of a sedimentation tank, said structure being of materially less thickness than said wall to provide a recess for the reception of the rim portion of a wheel mounted adjacent thereto, and including a pair of spaced parallel metallic plates having rigid studs projecting from one portion thereof for mounting the head shaft bearings of the scum and sludge removing conveyors, and having another portion thereof arranged to mount a drive shaft bearing.

ROBERT T. STEINDORF.